Figure 1:
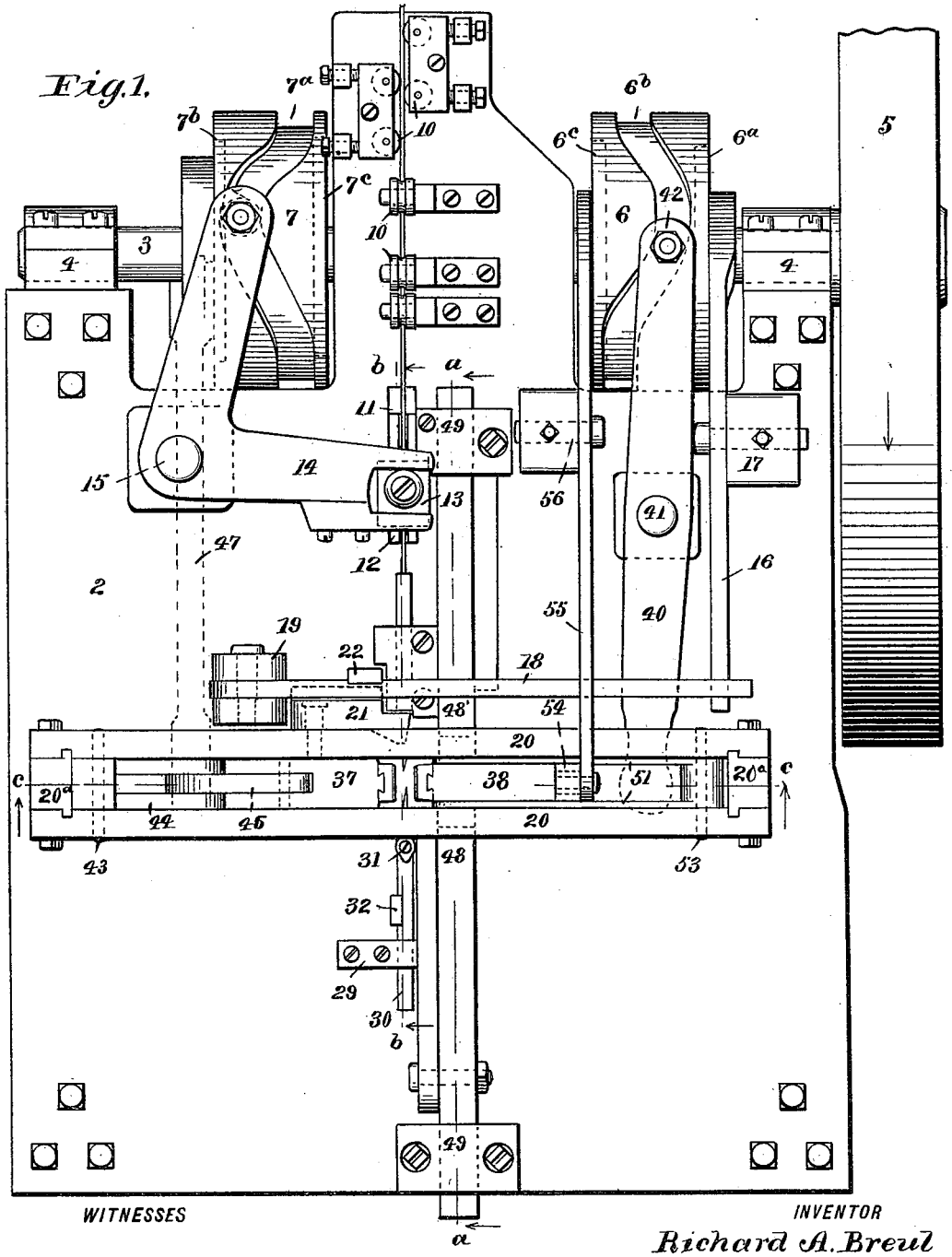

No. 621,957. Patented Mar. 28, 1899.
R. A. BREUL.
WIRE TACK MACHINE.
(Application filed Apr. 4, 1898.)
(No Model.) 5 Sheets—Sheet 1.

No. 621,957. Patented Mar. 28, 1899.
R. A. BREUL.
WIRE TACK MACHINE.
(Application filed Apr. 4, 1898.)
(No Model.) 5 Sheets—Sheet 2.
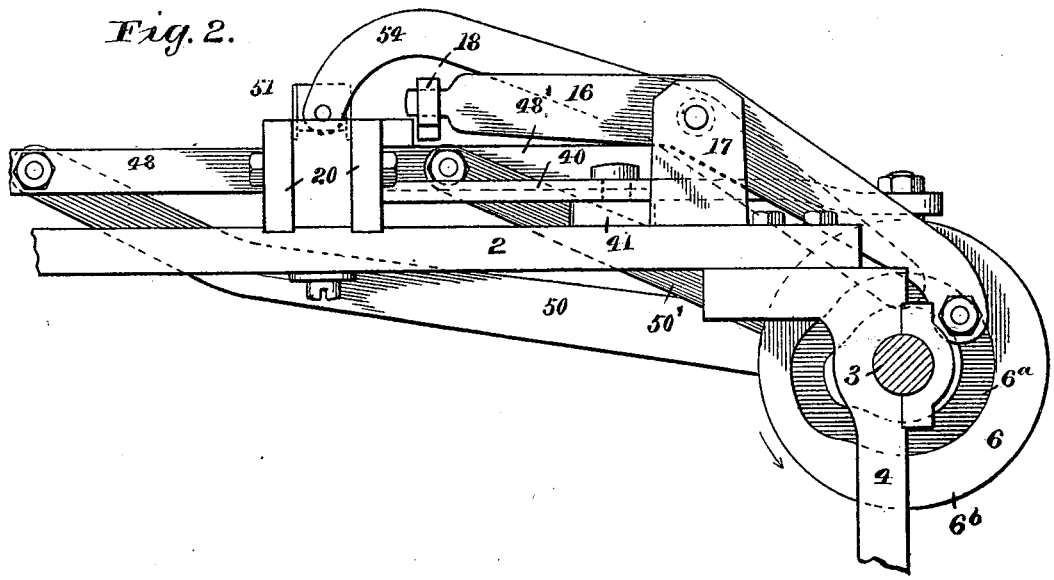
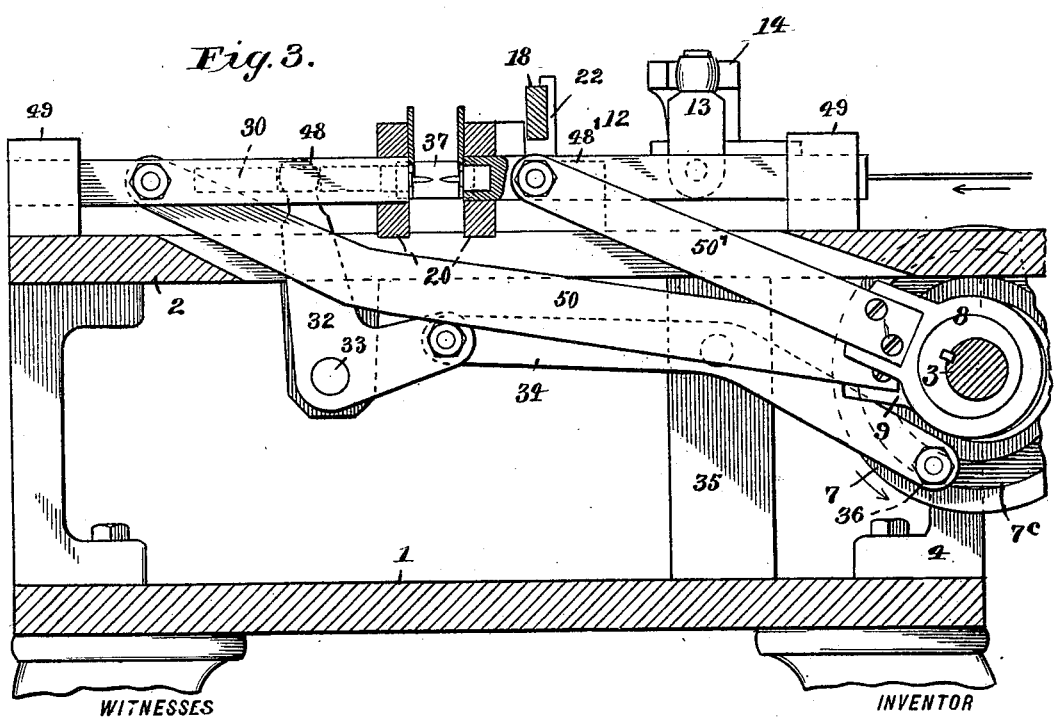
WITNESSES
R. H. Newman.
C. W. Spooner.
INVENTOR
Richard A. Breul
BY
Chamberlain & Newman
HIS ATTORNEYS No. 621,957. Patented Mar. 28, 1899.
R. A. BREUL.
WIRE TACK MACHINE.
(Application filed Apr. 4, 1898.)
(No Model.) 5 Sheets—Sheet 3.

WITNESSES
R. H. Newman
C. W. Spooner

INVENTOR
Richard A. Breul
BY
Chamberlain & Newman
HIS ATTORNEYS

No. 621,957. Patented Mar. 28, 1899.
R. A. BREUL.
WIRE TACK MACHINE.
(Application filed Apr. 4, 1898.)
(No Model.) 5 Sheets—Sheet 4.

WITNESSES
R. H. Newman.
C. W. Spooner.

INVENTOR
Richard A. Breul
BY
Chamberlain & Newman
HIS ATTORNEYS

No. 621,957. Patented Mar. 28, 1899.
R. A. BREUL.
WIRE TACK MACHINE.
(Application filed Apr. 4, 1898.)
(No Model.) 5 Sheets—Sheet 5.
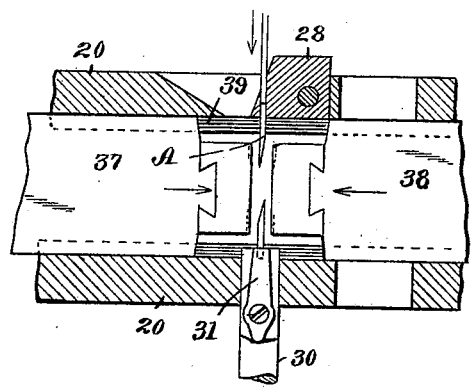
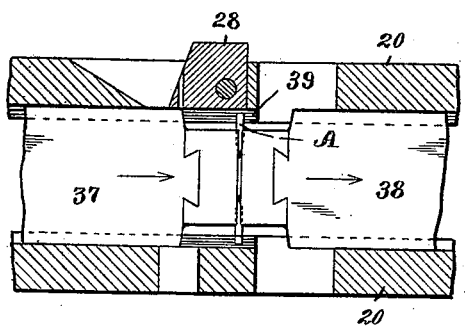
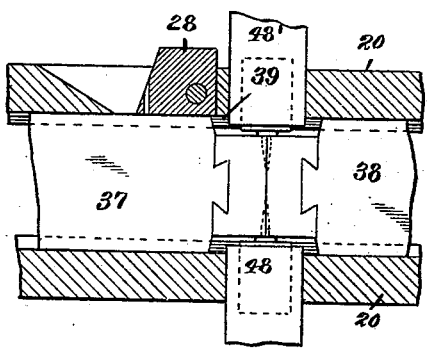
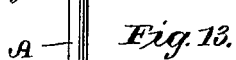
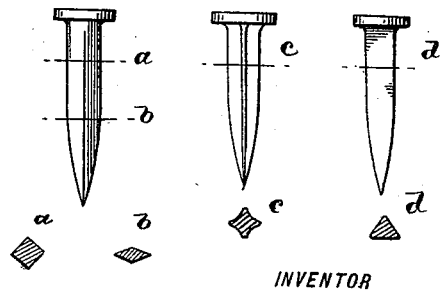
WITNESSES
R. H. Newman
Co. W. Spooner
INVENTOR
Richard A. Breul
BY
Chamberlain & Newman
HIS ATTORNEYS
THE NORRIS PETERS CO., PHOTO-LITHO., WASHINGTON, D. C.

UNITED STATES PATENT OFFICE.

RICHARD A. BREUL, OF BRIDGEPORT, CONNECTICUT.

WIRE-TACK MACHINE.

SPECIFICATION forming part of Letters Patent No. 621,957, dated March 28, 1899.

Application filed April 4, 1898. Serial No. 676,263. (No model.)

*To all whom it may concern:*

Be it known that I, RICHARD A. BREUL, a citizen of the United States, and a resident of Bridgeport, in the county of Fairfield and State of Connecticut, have invented certain new and useful Improvements in Wire-Tack Machines, of which the following is a specification.

This invention relates to new and useful improvements in tack-machines, and more particularly to that class wherein tacks are produced from wire being taken from a coil or other similar continuous supply.

It is the object of my invention to construct a machine of the above class which shall be entirely automatic in all its operations and whereby a completed tack of an improved character may be produced, to construct a simple, durable, and light-running machine which will not require the services of a constant attendant and which by a series of novel operations will produce tacks or sharp-pointed nails without scrap and waste perfectly pointed and of uniform shape and made harder, smoother, and stronger than the well-known cut tacks in general use.

It is, further, an important object of my invention to increase the capacity of tack-machines, which in the present instance I accomplish principally by severing and operating upon two blanks simultaneously and producing two completed tacks with each revolution of the main shaft.

I am aware that it is not broadly new to provide machinery for producing duplicate blanks in the art of making wire nails. However, inasmuch as the shape of a tack differs from a nail the machinery therefor of necessity must possess distinguishing features and requires somewhat different methods, operations, mechanism, and tools than those needed for and contained in a nail-machine.

With the above objects in view my invention resides and consists in the novel construction and combination of parts shown in the accompanying drawings, forming a part of this specification, in which similar characters of reference denote like or corresponding parts throughout the several figures, and of which—

Figure 4:
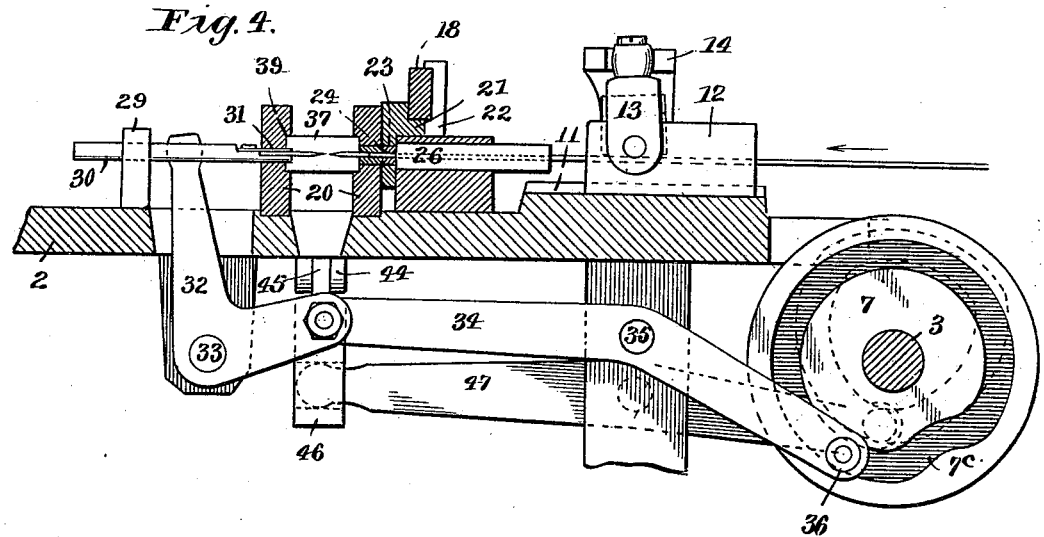
Figure 5:
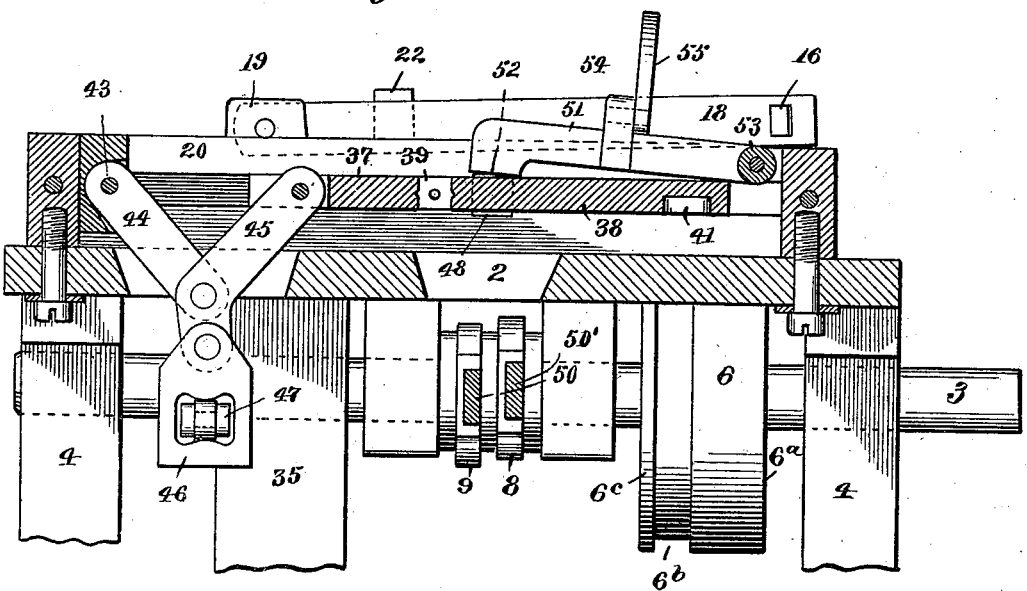
Figure 6:
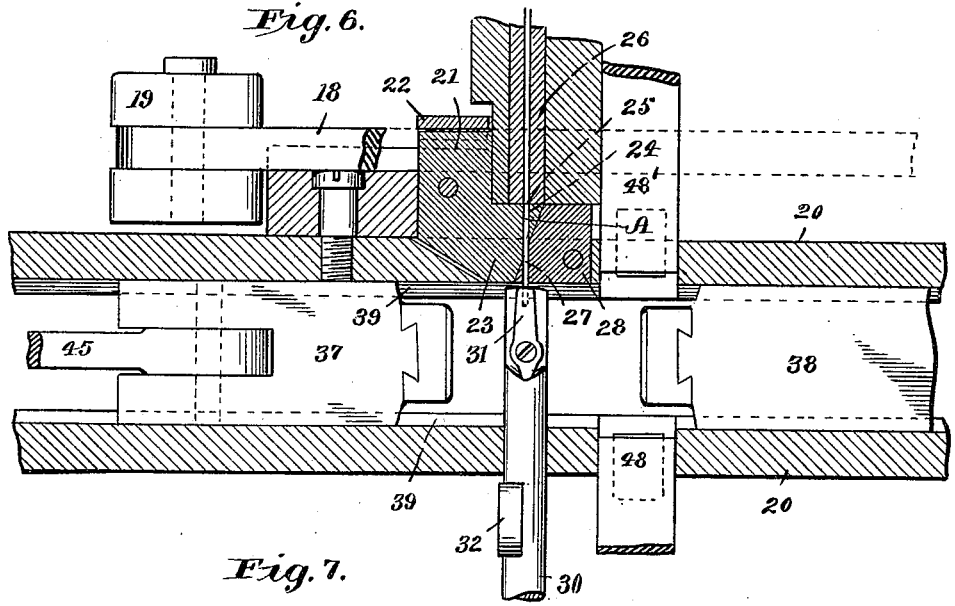
Figure 7:
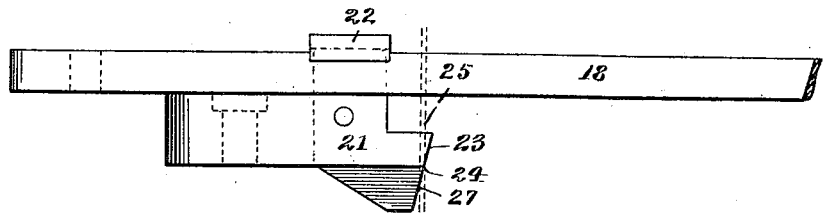
Figure 8:
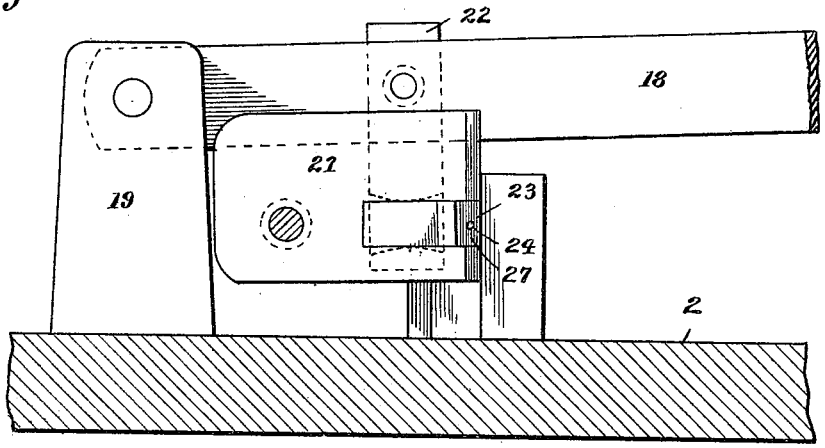

Figure 1 shows a plan view of my improved machine complete, the parts being in the act of feeding the wire forward and the swaging device closing upon the severed blanks. Fig. 2 is a detail side elevation of a portion of the machine as seen from the right of Fig. 1. Fig. 3 is a central vertical cross-section on line $a\,a$ of Fig. 1, the mechanism being shown in the act of heading a tack. Fig. 4 is a similar cross-section, but taken on line $b\,b$ of Fig. 1, the position of the parts agreeing with those of said figure. Fig. 5 is a cross-section taken at a right angle to the preceding sections and on line $c\,c$ of Fig. 1. Fig. 6 is an enlarged detail sectional plan view illustrating the mechanism for severing the blanks and shifting said blanks in position to be swaged. Figs. 7 and 8 show a detail plan and side elevation, respectively, of the movable die-holder for severing the blanks and illustrated in the preceding figures. Fig. 9 is an enlarged detail sectional plan view of the swaging-dies, the same being in the act of closing upon the wire blanks prior to their removal to the heading-dies, the position of the parts in said figure agreeing substantially with Fig. 1. Fig. 10 shows a similarly-enlarged view, the dies, however, being closed upon the blanks and in the act of transferring them to the headers. Fig. 11 illustrates the further and final operation—namely, that of heading the tacks—after which they are discharged from the machine. Figs. 12, 13, 14, and 15 illustrate the respective operations necessary to produce a tack in accordance with my improved machine. Figs. 16 and 17 illustrate modified forms of tacks, which can likewise be produced by my machine with but slight alterations in the shape of the swaging-dies.

As will be apparent from an inspection of the drawings, the wire from which the tacks are produced in my machine is fed forward to the position shown in Fig. 6, after which the cutter operates to sever or punch out the blank indicated by A and as is clearly shown in Fig. 13. This operation leaves a like blank at the wire end, which blank is grasped by the transporter and carried along lengthwise and in line with the feed-wire between and to the opposite side of the swaging-dies, which move together, while the second blank is also pushed forward by a feeding movement of the wire-supply. As soon as both blanks are properly placed between the clamping-dies the latter close upon and hold them, as will be apparent from Figs. 9 and 10. After the transporter has been retracted and is disengaged from its respective blank said dies carrying the two blanks move sidewise and toward and into line with the heading-dies. At the termination of said movement said swaging-dies are subjected to a heavy pressure, which serves to center the points and form or swage the two blanks simultaneously from the shape shown in Fig. 13 to that shown in Fig. 14, which consists of producing a round upper end, a square body portion, as shown at $a$, and a diamond or lance shape tapering end, as shown at $b$, which terminates in a sharp point. After said swaging operation the headers move inward, forming a rivet-like head from the exposed upper end of the blank, after which said dies return separately, while the stripper operates to eject the tacks from the dies. All the above operations are repeated in quick succession and same rotation.

Referring to the characters of reference marked upon the drawings, 1 indicates a table, 2 a bed, and 3 a driving-shaft journaled in bearings secured to the rear posts 4, connecting said bed and table. 5 is a power-wheel secured to said shaft, and 6 and 7 cams upon said shaft and having grooved cammed surfaces $6^a$ $6^b$ $6^c$ and $7^a$ $7^b$ $7^c$, respectively, by means of which levers are manipulated to perform their respective operations, as will later be more fully explained. Said shaft is further provided (see Figs. 3 and 5) with eccentrics 8 and 9, which through suitable mechanism operate the heading-rams, as will also be again and more specifically referred to. As previously stated, the wire from which tacks are produced by my machine is preferably taken from a continuous supply—as, for instance, a coil. It may feed into the machine through any suitable straightening device—as, for instance, a series of rollers, as indicated by 10. (Shown in Fig. 1.) The feeding device is likewise to some extent unimportant, the only special feature being that said operation in the present instance is being accomplished by two forward movements instead of the one continuous movement generally necessary in devices of this class.

The feeding device in the present instance consists of race 11, in which slide 12 operates and through the medium of the pivoted toggle 13, which in turn is actuated by a bell-crank lever 14, the latter being pivoted at 15 and bearing a roller to engage and be operated by the cam-groove $7^a$, previously mentioned. It is apparent that with each complete rotation of said cam the feed-slide is thrown to and fro and a length of wire fed into the dies, as shown in Figs. 6 and 12, sufficient to produce two tacks. The next operation is that of severing the blanks, which is accomplished through the medium of lever 16, pivoted to the stud 17 and operated by the groove $6^a$ of cam 6 in a manner to manipulate the arm 18, pivoted at 19. Adjacent to this arm and pivoted to the press-frame 20 is a die-holder 21, (see Figs. 6, 7, and 8,) which is connected by means of the link 22 to the arm 18, before mentioned, it thus being apparent that with each manipulation of said arm the die-holder 21 is likewise moved upon its pivot by a slight downward and a quick return movement to its normal position, thereby returning the severed blank A to register with the line of the feed-wire, as will be apparent. The wire-cutter preferably consists of a hardened-steel die 23 of the shape shown in the figures above referred to and is set in and rigidly carried by the holder 21, before mentioned. Said die contains a channel 24, through which the wire is fed and in which the blank A is retained while being cut from the main stock. The outer surface 25 of said die is straight and at a right angle to the length of the wire and when operated in connection with die 26 cuts the square end of the blank. The opposite cutting-face 27 of said die 23 is beveled and when operated against the fixed and correspondingly beveled-shaped die 28 serves to sever both blanks obliquely, as shown in Fig. 12, the second blank being the wire end, shaped just like blank A, Fig. 13. The press-frame 20, together with its end braces $20^a$, is rigid and self-sustaining, so that the large strain necessary for swaging may not react on and weaken the bed-casting. The press is held in place in the bed by ways and by screws in the end braces.

Through the press-frame 20 and a bracket 29 is slidably mounted a transporter 30, the forward end of which is provided with a yieldable spring 31, as clearly appears in Fig. 6. The action of this spring is to grasp the end of the forward blank when brought into engagement with it to remove said blank from the channel of the die 28 and transfer it to the position shown in Fig. 9 until in turn removed from the transporter by the action of the swaging-dies. Said transporter is manipulated (see Fig. 4) through a bell-crank lever 32, pivoted to a stud 33, and a lever 34, pivoted to post 35, bearing a roller 36, the latter engaging the cam-surface $7^c$ of the cam 7. It will thus be seen that the action of these parts simply causes a forward and backward sliding movement of the transporter and that upon engagement of a blank in a corresponding central cavity in the end of the transporter the spring acts to retain it there until removed by the clamping or swaging dies.

It may be stated here that in order to produce suitable blanks with oblique cuts it is necessary to do these cutting operations in dies having channels inclosing the wire. On account of the long oblique cut necessary for a tack-point the two blanks would be wedged tightly together and into the channel if a combined forward movement were imparted to them.

The swaging-dies 37 and 38 are slidably operated in ways 39 of the press-frame and are each provided with a reciprocating movement through the following mechanisms: The die 38 is reciprocated by a lever 40, pivoted to the stud 41 and operated by the engagement of its roller 42 with the cam-groove 6ᵇ of the cam 6. The other slide 37 is operated through a toggle-and-lever connection (see Figs. 4 and 5) as follows: Within the press-frame 20 is a fixed pin 43, to which one end of the link 44 is connected, the opposite end being connected with link 45, which is in like manner attached to the slide 37. From link 45 is suspended a yoke 46, which is engaged by the lever 47, pivoted to post 35 and operated by engagement with the cam-groove 7ᵇ of the cam 7.

It will be apparent from the foregoing construction that the slide 37 is afforded a reciprocating movement and that when near its extreme closed position the toggle-levers will be well up into the press-frame, and when brought to a complete horizontal position great force is exerted upon the die on slide 37, which is utilized to swage the blank into the shape shown in Fig. 14, the force of said operation being exerted through said die and against the die in slide 38, which remains stationary during said swaging operation. The movement of these dies with relation to each other is substantially as follows: Beginning with Fig. 9, the parts close simultaneously upon the two blanks and then all move together to the right, as indicated by arrows in Fig. 10, without altering the shape of the blanks. When said tack-blanks are brought into line with the heading-rams, the movement of the die 38 becomes checked, and by the toggle movement of the die-slide 37, above referred to, said blanks are swaged, as stated, whereupon said rams are moved inward and the heads formed, thus completing the tacks. While die 37 commences to recede, the die 38 remains in its position until after the stripper operates to remove the tacks which may be retained in either one of said dies. Thereafter the dies assume the position shown in Fig. 6, so that there may be sufficient room between the dies for admitting the transporter 30 to carry the next wire blank to the opposite side of these swaging-dies.

The heading-rams 48 and 48', as will be seen upon an inspection of Figs. 1 and 3, are mounted to slide in the press-frame 20 and brackets 49, secured to the bed. These heading-rams are afforded a short lengthwise movement through links 50 and 50', connected therewith and to the eccentrics 8 and 9, before mentioned, which are so arranged or timed that the rams open and close simultaneously and are returned out of the way when dies 37 and 38 make their return movement.

A very strong and safe pressure can be exerted by the headers arranged as above, as all the counterstrain on said headers is taken up by the connecting-links and the eccentrics 8 and 9, which are either formed in one piece or held firmly together. None at all or only an insignificant strain is thereby taken up by the bed of the machine and none by the shaft, as an equal pressure is exerted and sustained from opposite sides of the shaft. This is a desirable improvement on present rivet-head-forming mechanism, wherein the heading strain must be sustained by the tensile strength of the bed or machine casting, which must of necessity be very heavy and cumbersome. As a rule the strain also acts against one side of the driving-shaft only. It is apparent that under slightly-changed conditions the driving-shaft 3 may be raised and brought on a level or in line with the headers, whereby an absolutely direct pressure is exerted on the headers by eccentrics 8 and 9. This indicated change is being applied to my heavier machine.

By reason of the several operations upon the blank within the swaging-dies the tack when completed is liable to stick therein, and for this reason I have provided a stripping device which acts upon the heads of the tacks in a manner to eject the same from the dies in question. This stripping device and its operative connections will be readily understood from an inspection of Figs. 1, 2, and 5, wherein I have shown a stripper consisting of two arms 51, the free ends of which are deflected, as at 52. Said stripper is hinged between the press-frame 20 and to a pin 53, as clearly appears in the drawings. Between the arms 51 is secured a block 54, to which I connect a lever 55, pivoted to a stud 56 and operated from the cam-groove 6ᶜ. It will thus be seen from the foregoing construction that with each rotation of the cam and at the proper instant the stripper will be forced downward, so that the ends 52 will strike the upper side of the tack-heads no matter in which die they may be retained, thereby ejecting the finished tacks from the machine.

Having thus described my invention, what I claim, and desire to secure by Letters Patent, is—

1. In a wire-tack machine, the combination with an intermittent feed and mechanism for cutting two obliquely-pointed blanks, of means for grasping one of said blanks by friction and withdrawing it from the cutting-die and moving it along in line with the feed.

2. In a wire-tack machine, mechanism to produce two pointed blanks, a transporter having a blank-retaining spring and intermittent sliding motion, all arranged to withdraw the first blank from the channel of said cutting-dies and advance it in line with the feed, substantially as described.

3. In a wire-tack machine having feeding and cutting mechanism for forming two obliquely-pointed blanks, means for discharging one blank from the cutting-dies separately and for advancing both blanks in line with the feed, in combination with shaping-dies alternately presenting their shank and point forming cavities in line with the feed-wire and in line with the head-forming rams.

4. In a wire-tack machine, the combination of feeding and cutting mechanism for producing two obliquely-pointed blanks, of means for depositing said blanks in opposite ends of dies having recesses for bending said points into central line, and means for swaging said blanks without loss of material and producing a tack-point of symmetrical shape.

5. In a wire-tack machine, the combination with feeding and cutting mechanism for producing from one wire-supply and without scrap, two wire blanks pointed at one end, of two dies for shaping the pointed blank ends and adapted to move with the two blanks from the line of feed to and between the headers, heading-rams adapted to operate against said dies, substantially as described.

6. In a wire-tack machine, the combination of dies for cutting two blanks each with an obliquely-pointed end, mechanism for separately moving the two blanks along in line of said feed, means for placing their pointed ends into cavities at opposite ends of the swaging-dies, and an independent press-frame 20 having end braces 20ª and way 39 for die-slides 37 and 38, substantially as described.

7. In a wire-tack machine, the combination of dies for cutting two obliquely-pointed blanks, mechanism for separately advancing in line of the feed the two blanks, and means for placing the pointed ends into cavities located at opposite ends of the swaging-dies, mechanism for shifting together the dies with the blanks into line with and between two oppositely-acting heading-rams.

8. In a wire-tack machine, the combination of swaging-dies mounted on slides located and moving in a rigid press-frame held independently to the bed, means to operate said dies with, from, and against each other in a manner to convey blanks by friction during the passage of the dies from the line of feed to line with the headers, and mechanism for exerting a swaging pressure on the dies, said pressure being localized within and sustained by the press-frame.

9. Head-forming mechanism consisting of two heading-rams, means for pushing and pulling said rams, a blank-holding die interposed between said rams, connecting-links secured to a single cam, giving opposite eccentric motion to each link and ram.

10. Head-forming mechanism comprising blank-holding dies situated between two heading-rams, opposite eccentrics contained on a single shaft and links connecting said headers and eccentrics, whereby the headers are simultaneously operated against the holding-dies, substantially as shown.

11. A tack-machine of the class described, the same comprising blanking mechanism, swaging-dies to receive blanks, ways in which said dies are slidably mounted, lever 40 for operating one of said dies, a lever-and-toggle connection for operating the other die oppositely located, heading-rams to operate against the sides of said dies to form heads.

12. In a wire-tack machine, the combination of swaging-dies to form blanks with an oblique end into pointed shanks of symmetrical shape and without loss of material, with an independent press-frame, in which said dies slide and mechanism to alternately open and close said dies, substantially as described.

13. In a tack-machine, the combination with holding-dies, of a stripping-plate sweeping the ends of said dies and engaging the tack-heads protruding therefrom, said strippers being arranged to operate alike on both opened dies, substantially as shown.

14. In a duplicate wire-tack machine, the combination with heading dies and rams, of stripping mechanism consisting of a swinging lever provided with plates to sweep the ends of the dies and arranged to eject the two tacks from the cavities in the openings of said dies, substantially as described.

15. In a wire-tack machine, the combination of fixed dies 26 and 28, of an intermediate movable die having a straight and a bevel cutting edge to register with the dies aforesaid, means for alternately moving, returning and retaining said movable die in line with the feed-wire and fixed dies, a transporter to receive the forward blank and hold it for engagement by the swaging-dies, dies to receive said blank and convey it to the heading-rams which are in line with and adapted to act toward each other.

16. The combination in a tack-machine of fixed dies 26 and 28, and movable die 23 for producing two bevel-pointed wire blanks, means for engaging and removing the forward blank in advance of the second blank and in line with the outer operative face of the swaging-dies, dies adapted to bend and center said bevel-points, means for swaging said centered points, and means for heading said blanks, substantially as shown.

17. The combination in a tack-machine, of mechanism for simultaneously severing from a single wire-supply, two bevel-pointed wire blanks, a transporter for removing and delivering one, and means for feeding the second of said blanks to the swaging-dies, means for operating upon the blanks and centering their bevel-points, and mechanism for heading said blanks.

18. The combination in a tack-machine, of mechanism for simultaneously cutting two single blanks, a transporter to convey and hold one of said blanks, swaging-dies 37 and 38 to receive said blanks, and means for operating said dies with and against each other, mechanism for shifting said dies and blanks in line with the heading-rams, means for operating the dies and rams to shape and complete the tack.

19. A tack-machine of the class described, the same comprising mechanism for simultaneously severing two wire blanks, swaging-dies having recesses to receive said blanks, means for introducing said blanks into said recesses from opposite sides, means for transferring said blanks from the line of feed to a line with and between a pair of heading-rams, mechanism for operating said heading-rams to complete the tack, and a stripper to engage the head of said tacks and disconnect the same from the dies.

20. A tack-machine of the class described, the same comprising blanking mechanism, dies for carrying, centering and swaging the blanks, mechanism for operating said dies with, from, and against each other, oppositely-located heading-rams, a double eccentric for operating said rams, and a stripper for ejecting the completed tacks by engagement with the heads.

21. A tack-machine of the class described, the same comprising feeding mechanism for producing duplicate blanks, a transporter to receive one of said blanks, dies for receiving the ends of said wire blanks, means for introducing said blanks at opposite sides of the dies, mechanism for operating said dies to shift and swage said blanks, rams 48 and 48' in line with each other for heading the blanks and eccentrics for simultaneously operating said rams toward each other.

22. A tack-machine substantially as herein shown and described, comprising blanking mechanism, a transporter adapted to grasp and remove one blank, a lever 32 and connections therewith for operating said transporter, swaging-dies to receive two blanks in line with each other, and from opposite sides, rams to head said blanks and means for ejecting the completed tack.

Signed at Bridgeport, in the county of Fairfield and State of Connecticut, this 1st day of April, A. D. 1898.

RICHARD A. BREUL.

Witnesses:
C. M. NEWMAN,
AUBREY DE WOLFE.